J. T. HARNETT.
CAST IRON PIPE AND COUPLING THEREFOR.
APPLICATION FILED AUG. 12, 1918.
1,299,934.
Patented Apr. 8, 1919.
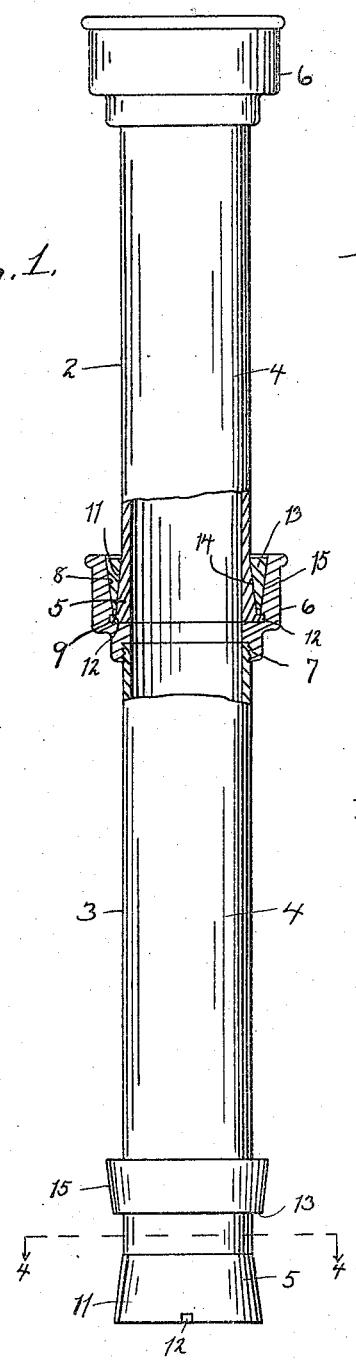
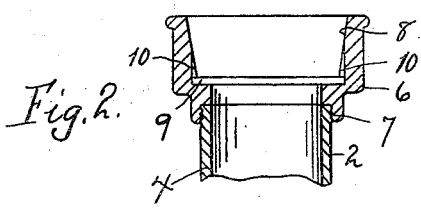
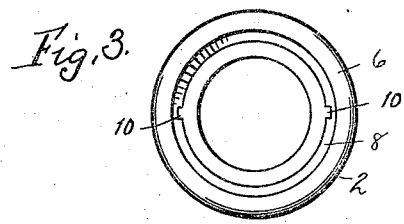
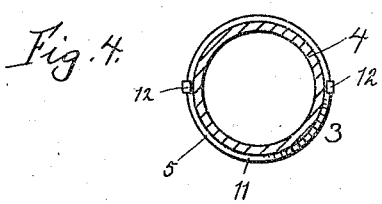
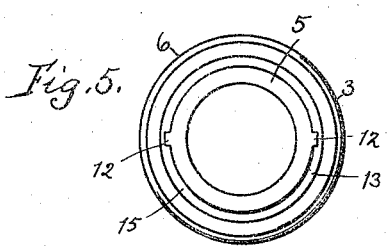
INVENTOR
John T. Harnett
By W. W. Williamson
Atty.

UNITED STATES PATENT OFFICE.

JOHN T. HARNETT, OF PHILADELPHIA, PENNSYLVANIA.

CAST-IRON PIPE AND COUPLING THEREFOR.

1,299,934.              Specification of Letters Patent.          Patented Apr. 8, 1919.

Application filed August 12, 1918. Serial No. 249,434.

*To all whom it may concern:*

Be it known that I, JOHN T. HARNETT, a citizen of the United States, residing at Philadelphia, in the county of Philadelphia and State of Pennsylvania, have invented new and useful Improvements in Cast-Iron Pipes and Couplings Therefor, of which the following is a specification.

My invention relates to new and useful improvements in cast iron pipes and couplings therefor, and has for its object to so construct the ends of a cast iron pipe that they may be readily coupled or jointed together without the use of a molten metal, such as lead and one in which all of the parts necessary for making a proper joint are assembled together so that no outside articles are necessary and the parts cannot become misplaced or lost.

A further object of my invention is to provide a cast iron pipe with a bell or a socket at one end having an inclined or a diverging face with a groove or slot within the bell, said pipe having its other end a tapered or inclined wall or outer face the incline being opposite that of the bell thereby forming a frusto-conical portion, said end further having lugs for registration with the groove in the bell of a coöperating pipe.

A still further object of the invention is to provide in combination a sectional cast iron pipe, each section having a bell or female end with an inclined inner face and a spigot or male end having an inclined outer face and an iron ring having oppositely inclined faces to engage the inclined faces of the bell and spigot ends when two sections of pipe are joined together, the said ends having means for co-acting to prevent the accidental displacement of the sections.

With these ends in view my invention consists in the details of construction and combination of elements hereinafter set forth and then specifically designated by the claims.

In order that those skilled in the art to which this invention appertains may understand how to make and use the same I will describe its construction in detail referring by numeral to the accompanying drawing forming a part of this application in which—

Figure 1, is a side elevation of two co-acting sections of cast iron pipe constructed in accordance with my invention, portions being shown in section one to clearly illustrate the construction.

Fig. 2, is a fragmentary longitudinal section of the bell or female end of one of the pipe sections.

Fig. 3, is an end view thereof.

Fig. 4, is a section of the line 4—4 of Fig. 1, and

Fig. 5, is an opposite end view of one of the pipe sections.

In carrying out my invention as here embodied 2 and 3 represent two sections of cast iron pipe both of which are identical in construction, and the ends of which are joined together to provide a pipe of the desired length and these sections each comprise a stem or body 4, a spigot or male end 5 and a bell or female end 6 the latter in practice being formed separate from the stem or body and attached to one of said stems by means of threads 7 or other equivalent.

The bell or female end 6 is provided with an inclined inner face or wall 8 diverging outwardly and at the inner end of this inclined wall is formed an annular groove 9 with which communicates a plurality of longitudinal channels 10 preferably two in number and oppositely disposed and these channels pass through the inclined wall and are as deep as the annular groove.

The spigot or male end 5 is provided an exterior inclined outer face or wall 11, which diverges outwardly or is inclined in a direction opposite to the inclined face or wall of the bell or female end so that when the spigot or male end of one section is inserted in the bell or female end of a co-acting section, the inclined walls will approximately meet within the bell while the greatest space between these walls will be at the outer end of the bell as plainly shown in Fig. 1. The spigot or male end is further provided with a plurality of lugs 12 preferably two in number and oppositely disposed so as to register with the channels 10 when two sections of pipe are to be joined or coupled together.

The inclined faces or walls are preferably ground or in some way finished to produce relatively smooth surfaces with which will co-act the coupling ring 13 which is triangular in cross section or is provided with two oppositely inclined faces 14 and 15 which are also ground or otherwise finished to provide relatively smooth surfaces for engagement with the inclined walls or faces of the bell and spigot ends of two co-acting pipe sections, thereby making an exceedingly secure tight joint without the use of soft packing or molten metal.

In practice when two sections of my improved pipe are to be joined together the spigot or male end of one section is inserted in the bell or female end of the adjoining section with the lugs 12 registering with the channels 10, and when the spigot end has been inserted entirely within the bell end of the adjacent section the lugs 12 will then be in alinement with the annular groove 9 at which time one of said sections is rotated to remove the lugs 12 from the channels 10 and cause said lugs to enter the groove together and prevent endwise or parting movements of the sections. After the two sections are thus fastened to each other the coupling ring 13 is then moved along its pipe section until it enters the space between the inclined walls or faces of the two co-acting sections after which the ring may be driven home thus making a complete water and gas tight joint which will be very durable and serviceable.

The coupling ring 13 is to be of non-expansible metal and I have found it necessary to make the bell separate from the stem or body of the pipe section, but after said ring is placed on the stem or body the bell is then attached in a permanent manner and for all purposes becomes an integral part thereof.

Of course I do not wish to be limited to the exact details of construction as herein shown as these may be varied within the limits of the appended claims without departing from the spirit of my invention.

Having thus described my invention what I claim as new and useful is:—

1. As an article of manufacture, a cast iron pipe section comprising a stem or body, said stem having an inclined outer face at one end and provided with lugs and a bell at the opposite end having an inclined inner face with longitudinal channels leading to an annular groove and a ring having oppositely inclined faces, mounted on the stem.

2. A sectional cast iron pipe and coupling comprising a plurality of identical sections, each section consisting of a stem or body having an inclined outer face at one end, lugs formed with said end, a bell having an inclined inner face carried by the opposite of the stem, said bell further having an annular groove at the inner end of the inclined face and provided with longitudinal channels passing through the inclined face and communicating with the groove, said channels being as deep as the outer circumference of the groove and a ring having oppositely inclined faces, carried by the stem and adapted to register with the space between the outer face of the spigot end and the inner face of the bell when the spigot end of one pipe section has been placed in the bell of another section and the lugs caused to pass through the channels and into the groove as specified.

In testimony whereof, I have hereunto affixed my signature.

JOHN T. HARNETT.

Copies of this patent may be obtained for five cents each, by addressing the "Commissioner of Patents, Washington, D. C."